Sept. 16, 1941.  E. G. ERSON  2,256,284
BRAKE CONTROL MEANS
Filed April 26, 1940  2 Sheets-Sheet 1

INVENTOR
ERIK G. ERSON
BY
ATTORNEY

Sept. 16, 1941.  E. G. ERSON  2,256,284
BRAKE CONTROL MEANS
Filed April 26, 1940  2 Sheets—Sheet 2

Fig. 2.

INVENTOR
ERIK G. ERSON
BY A. M. Higgins
ATTORNEY

Patented Sept. 16, 1941

2,256,284

UNITED STATES PATENT OFFICE 2,256,284

BRAKE CONTROL MEANS

Erik G. Erson, Wilkinsburg, Pa., assignor to The Westinghouse Air Brake Company, Wilmerding, Pa., a corporation of Pennsylvania Application April 26, 1940, Serial No. 331,686

29 Claims. (Cl. 303—18)

This invention relates to locomotive brake equipment and more particularly to the type embodying means operable by the engineer to control the brakes on the locomotive and cars of a train, and operable also by means responsive to a change in track signals, in case of unfavorable traffic conditions, for automatically applying the brakes on the locomotive and cars of the train.

In the copending application of Ellis E. Hewitt and Donald L. McNeal, Serial No. 326,352, filed March 28, 1940, there is disclosed a brake equipment of the above type which is operative either by the engineer or in response to a change in track signals for controlling the brakes on the locomotive and train through the medium of either a brake pipe, involving the usual automatic principle, or a straight air train pipe, involving the usual straight air principle.

The Hewitt and McNeal brake equipment embodies an engineer's brake valve device having an automatic portion for controlling the brakes automatically through the brake pipe and a straight air portion for controlling the brakes by straight air through the straight air pipe. A selector handle on the side of the brake valve device is movable to an automatic position for rendering the automatic portion operative and to a straight air position for rendering the straight air portion operative. The equipment further comprises a brake application valve device which is adapted to operate automatically upon an adverse change in track signals to apply the brakes on the locomotive and cars of the train through the medium of either the brake pipe or straight air pipe.

Also associated with the brake equipment is an automatic suppression device and a straight air suppression device, either one or the other of which is adapted to operate to prevent response of the brake application valve device to a change in track signals if the engineer is alert and operates the brake valve device to initiate an application of the brakes on the locomotive and train promptly when warned of such change. The automatic suppression device is operative upon operation of the brake valve device when the selector handle is in the automatic position, while the straight air supression device is operative upon operation of the brake valve device when the selector handle is in the straight air position.

The straight air suppression device is controlled by straight air pipe pressure and in order to insure the prompt operation thereof, upon initiating a straight air application of the brakes by the brake valve device, so as to prevent response of the brake application valve device to a change in track signals, the fluid for operating said suppression device is taken from a communication ahead of a choke through which the fluid pressure is adapted to be supplied to the straight air pipe for effecting the straight air application of brakes. By this arrangement the fluid pressure for operating the straight air suppression device builds up ahead of that in the straight air pipe to provide prompt suppression operation of said device, whereas if the suppression device were connected directly to the straight air pipe and the pressure for operating same therefore increased with straight air pipe pressure, the suppression device would not be operated until the straight air pipe pressure had been increased to a degree which would provide substantially a full straight air application of brakes.

With the choke arrangement however it will be noted that in case the supply of fluid ahead of the choke is limited or cut off by the brake valve device before the pressure in the straight air pipe is increased to a degree which would insure the straight air suppression device remaining in the suppression position, the pressure holding the suppression device in the suppression position will equalize through the choke into the straight air pipe and the suppression device will then move out of its suppression position and permit operation of the brake application valve device to effect an automatic application of the brakes on the locomotive and train. In other words, in order that the straight air suppression device will remain in its suppressing position to maintain the brake application valve suppressed, it is necessary that the engineer provide a continuous increase in pressure in the straight air pipe to the degree required for operating the independent suppression device.

On certain railroads employing this type of brake equipment an electropneumatic straight air application of brakes on the locomotive and cars of a train is at times effected in two stages or steps with a time interval between the steps; that is, the engineer will operate the brake valve device to provide an initial pressure in the straight air pipe of for instance from fifteen to twenty pounds and then after a relatively short lapse of time he will operate the brake valve device to increase the pressure in the straight air pipe as required to obtain a desired degree of braking. With this type of control of straight air pipe pressure the straight air suppression device will prevent operation of the brake application valve device only during the initial step of increase in pressure in the straight air pipe, since during the interval of time between the two steps the pressure on the suppression device will reduce into the straight air pipe to such a degree that the suppression device will operate to cause the brake application valve device to respond to the unfavorable track signal, which is undesired.

The straight air suppression device above described was not intended to provide permanent suppression of the brake application valve device upon a change in track signals when the straight air pipe pressure was increased in steps as just described, rather it was designed to provide permanent suppression of the application valve device only when a straight air application of brakes is effected in a single and continuous step up to the degree required for holding the device in its suppressing position.

The principal object of the invention is therefore to provide a straight air suppression device which is adapted to operate to suppress the operation of the application valve device when the brake valve device is operated to effect a straight air application of brakes on the locomotive and cars of a train in either a single continuous step or in two steps with an intervening lapse of time, as above described.

Other objects and advantages will be apparent from the following more detailed description of the invention.

In the accompanying drawings.

Figure 1:
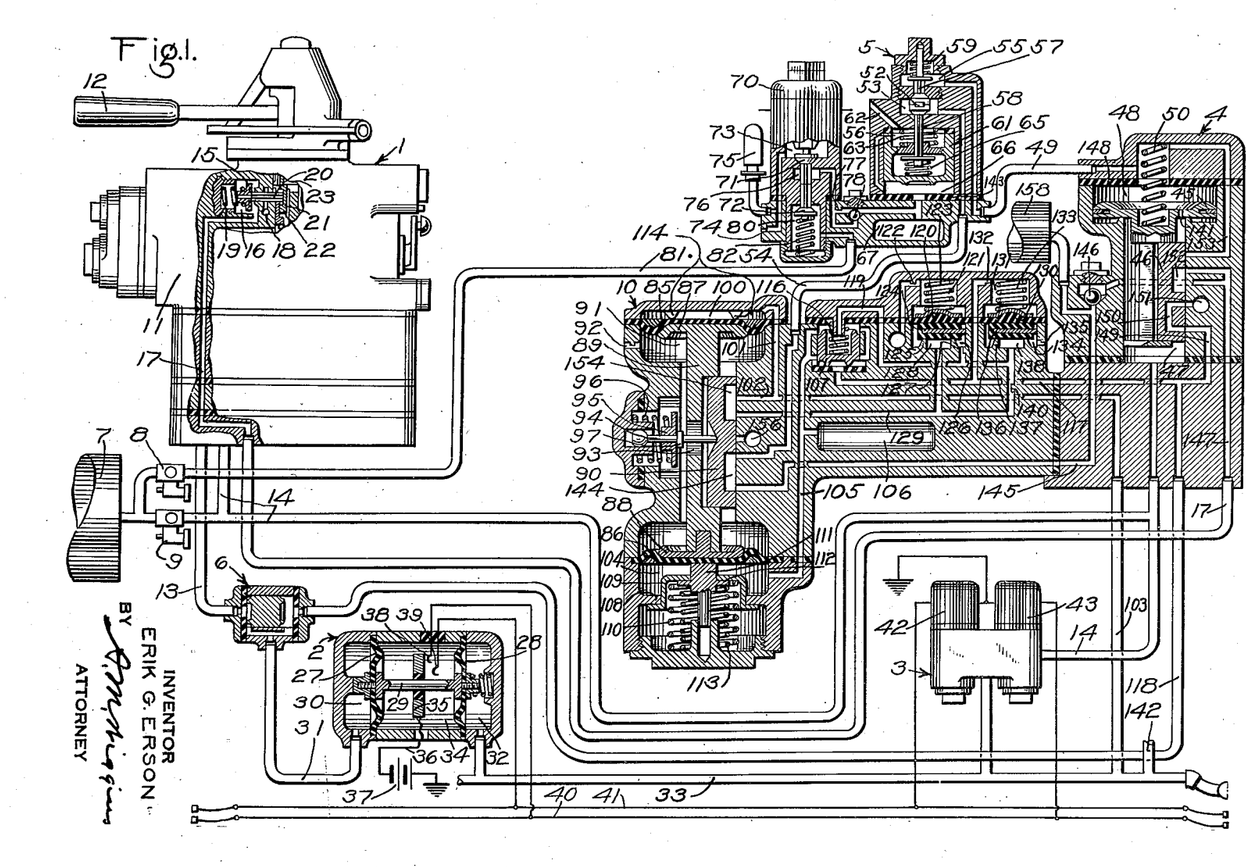
Fig. 1 is a diagrammatic view, partly in section and partly in outline, of a portion of a locomotive brake equipment embodying the invention.

*Description of parts in Fig. 1*

The straight air suppression valve device embodying the present invention is adapted to be associated with a locomotive brake equipment of the type disclosed in the aforementioned pending application, however, only those parts are shown in the drawing of the present application which are deemed essential to a clear understanding of the invention.

The brake equipment shown in the drawing comprises an engineer's brake valve device 1, a master switch device 2, an application and release magnet valve device 3, a brake application valve device 4, a timing device 5, a double check valve device 6, a main reservoir 7, and two feed valve devices 8 and 9. Associated with the brake application valve device 4 and removably secured thereto is a straight air suppression valve device 10, constructed in accordance with the present invention.

The engineer's brake valve device 1 comprises a self-lapping brake application and release valve portion 11 adapted to be controlled by movement of a handle 12 in an application and release zone for varying the fluid pressure in a straight air control pipe 13 in accordance with the position of said handle in said zone. Movement of handle 12 in one direction is adapted to increase the pressure in pipe 13 in accordance with the degree of brake application desired on the locomotive and cars of a train, while movement of the handle in the opposite direction is adapted to reduce the pressure in said pipe for releasing the brakes on the locomotive and cars of the train. Fluid under pressure for supply by the valve portion 11 of the brake valve device to pipe 13 is obtained from the main reservoir 7 through the feed valve device 9 and feed valve pipe 14. A further description of these parts of the engineer's brake valve device is not deemed essential to a clear understanding of the present invention.

The engineer's brake valve device 1 further comprises a poppet valve 15 contained in a chamber 16 which is connected by passage and pipe 17 to the brake application valve device 4. The valve 15 is provided for controlling communication between chamber 16 and a vent port 18 which leads to the atmosphere. A spring 19 in chamber 16 acts on valve 15 for urging it to its seat. The valve 15 has a stem 20 extending through a bore in the casing for engagement by a cam 21 provided on a sleeve 22 which is secured to a shaft 23 connected to the handle 12 for rotation thereby and through the medium of which the self-lapping valve portion 11 of the brake valve device is controlled. In the usual release position of the brake valve handle 12, in which it is shown, the cam 21 is adapted to unseat the valve 15, while upon movement of the handle out of the release position to supply fluid under pressure to the straight air control pipe 13 to effect a straight air application of the brakes on the locomotive and cars of the train the cam 21 is operative to permit spring 16 to move the valve 15 to its seated position.

The master switch device 2 comprise a casing containing two flexible diaphragms 27 and 28 arranged in spaced relation and connected by a stem 29 for movement together. The diaphragm 27 has at its outer face a chamber 30 which is connected by a pipe 31 to the side outlet of the double check valve device 6. At the opposite face of diaphragm 28 there is provided a chamber 32 which is in permanent communication with a straight air train pipe 33 through which the brakes on the locomotive and cars of a train are adapted to be controlled on the usual straight air principle. Intermediate the diaphragms 27 and 28 there is a chamber 34 which contains a movable contact 35 secured to but properly insulated from the stem 29 and movable with said stem upon deflection of the diaphragms 27 and 28. The contact 35 is connected by a suitable conductor 36 to any desired source of electric current such as to one terminal of a battery 37 the other terminal of which is grounded. Carried by the casing and extending into chamber 34 for engagement by the contact 35 are a pair of contact fingers 38 and 39, said fingers being so arranged that upon movement of contact 35 in the direction of the right hand said contact will engage first the finger 38 and then the finger 39, while upon movement of contact 35 in the reverse direction said fingers will be disconnected therefrom in the reverse order. The finger 38 is connected to a release train wire 40 while the finger 39 is connected to an application train wire 41.

The application and release magnet valve device 3 comprises an application magnet valve portion 42 connected to the application train wire 41 and a release magnet valve portion 43 connected to the release train wire 40. Energization of the application magnet valve portion 42 upon supply of electric current to the application train wire 41 is adapted to supply fluid under pressure from the feed valve pipe 14 to the straight air pipe 33 for effecting a straight air application of brakes, while deenergization of said portion is adapted to cut off the supply of fluid under pressure to the straight air pipe for limiting the degree of a brake application or for permitting a release of brakes. The release magnet valve portion 43 is normally deenergized to permit the venting of fluid under pressure from the straight air pipe 33 for effecting the release of a straight air application of brakes and is operative upon energization to close the vent from the straight air pipe 33 so that the brakes may be applied in accordance with the operation of the application magnet valve portion 42.

The brake application valve device 4 comprises a casing containing a piston 45 and a slide valve 46 connected to said piston for movement therewith. The slide valve 46 is contained in a chamber 47 at one side of the piston 45 and said chamber is connected to the feed valve pipe 14 and is at all times charged with fluid under pressure supplied by the feed valve device 9. At the opposite side of the piston 45 there is a chamber 48 connected to a control pipe 49 and containing a spring 50 acting on the piston for urging the same and the slide valve 46 to their normal position shown.

The timing valve device 5 comprises a double beat valve 52 contained in a chamber 53 which is connected by passages and pipe 54 to the straight air suppression valve device 10. The double beat valve 52 is provided for controlling communication between chamber 53 and a chamber 55 above the valve and a chamber 56 below the valve, said valve having oppositely disposed fluted stems 57 and 58 extending through suitable bores in the casing into the chambers 55 and 56, respectively.

The chamber 55 is in permanent communication through pipe 49 with the application piston chamber 48 and contains a spring 59 acting on the fluted stem 57 for urging the double beat valve 52 to its lower seated position. The chamber 56 is formed at the upper face on a valve piston 61 which is slidably mounted in the casing, said chamber being open to the atmosphere through a port 62 and containing a spring 63 acting on said valve piston for urging it to its lower position.

Interposed between the valve piston 61 and the fluted stem 58 is a spring 65 which is operative when said valve piston is in the position shown to hold the double beat valve 52 in its upper seated position. At the lower face of the valve piston 61 there is a chamber 66 in communication with a volume reservoir 67.

An electromagnet 70 is provided which is adapted to be controlled by mechanism (not shown) responsive to changes in track signal circuits in such a manner that when the track signals are favorable the magnet 70 will be energized and when unfavorable, requiring that the train be slowed down or stopped, deenergized.

The electromagnet 70 is arranged to control two oppositely seating coaxially arranged poppet valves 71 and 72. The valve 71 is contained in a chamber 73 which is open to the atmosphere through a restricted vent port 74 as well as by way of a signal whistle 75 and said valve is arranged to control communication between said chamber and a chamber 76 which is open to the volume reservoir 67 through a communication including a restricted portion or choke 77 and a check valve 78, the check valve 78 being provided to allow rapid flow of fluid under pressure in the direction of reservoir 67, while the restricted portion 77 is adapted to restrict the flow of fluid from reservoir 67 to the chamber 76.

The valve 72 is contained in a chamber 80 which is constantly supplied with fluid at a desired reduced pressure from the feed valve device 8 through a pipe 81. A spring 82 in chamber 80 acts on the valve 72 for urging it in the direction of its seat. The valve 72 is provided for controlling communication between the chamber 80 and chamber 76 and said valve as well as the valve 71 have fluted stems which engage to provide for movement of the two valves in unison.

When the magnet 70 is in its normally energized condition the valve 71 is adapted to be seated and the valve 72 unseated under which condition fluid under pressure supplied by the feed valve 8 to valve chamber 80 is adapted to flow to chamber 76 and then past the check valve 78 to the reservoir 67 and chamber 66 below the valve piston 61 to act on said valve piston for holding same and thereby the double beat valve 52 in their upper positions, as shown. Upon deenergization of the magnet 70 spring 82 is adapted to seat the valve 72 and to unseat the valve 71 for thereby opening the chamber 66 below valve piston 61 and the reservoir 67 to the atmosphere through the restricted port 77 and past the magnet valve 71 to vent port 74 and whistle 75.

The straight air suppression valve device 10 comprises a casing containing a pair of flexible diaphragms 85 and 86 arranged in spaced relation with respect to each other. The adjacent faces of the two diaphragms 85 and 86 engage, respectively, two followers 87 and 88 provided on the opposite ends of a stem 89. The stem 89 is suitably notched to receive a slide valve 90 which is adapted to be moved with the stem upon deflection of the diaphragms 85 and 86. The stem 89 and slide valve 90 are contained in a chamber 91 which is in constant communication with the atmosphere through a restricted vent port 92. Directly over the slide valve 90 the stem 89 is provided with an aperture 93 and through this aperture a rocking pin 94 extends and engages the slide valve within a suitable recess. The opposite end of the rocking pin 94 is preferably ball shaped and slidably mounted in a suitable bore in the casing. A spring seat 95 is slidably mounted on the pin 94 and interposed between said seat and casing is a spring 96 for urging the seat 95 against a collar 97 on the stem to thereby transmit the pressure of the spring to the slide valve 90 for holding it against its seat at all times.

At the outer face of diaphragm 85 there is a chamber 100 which is connected by a passage 101 to a passage 102 one end of which terminates at the seat of slide valve 90 while the other end is connected to a pipe 103 leading to the straight air pipe 33. At the outer face of the diaphragm 86 is a chamber 104 which is connected by a passage 105 to a volume chamber or reservoir 106 and to the side outlet of a double check valve 107.

The casing is provided in chamber 104 with an annular collar 108 and mounted to slide through this collar is a spring cage or seat 109 which has an annular flange disposed below the collar 108 and adapted to engage same for limiting movement of the cage in an upwardly direction. Interposed between the cage and the lower end of the casing is a spring 110 for urging the cage into engagement with collar 108. A plunger 111 having one end slidably mounted in a suitable bore in the casing extends through an aperture provided centrally in the spring cage 109 into engagement with the lower face of diaphragm 86. A collar 112 is provided on the plunger 111 within the spring cage 109 and a spring 113 is provided to act on said collar for urging same into engagement with the spring cage and for thereby urging the plunger 111 to its normal position shown. The end of the portion of the plunger 111 extending through the spring cage 109 engages the outer face of the diaphragm 86. With the collar 112 in engagement with the spring cage 109 and with said spring cage engaging the collar 108 on the casing, said plunger and lugs 114 extending into the chamber 100 for engagment with by diaphragm 85 define the normal position of diaphragms 86 and 85 and thereby of the slide valve 90.

One end of the double check valve 107 is connected to a passage 117 which leads to the seat of slide valve 46 and which is also connected to a pipe 118 leading to the double check device 6. The other end of the double check valve 107 is connected to a passage 119 and a spring 116 is provided to act on this end of the double check valve.

The straight air suppression valve device also comprises a flexible diaphragm 120 having at one side a chamber 121 in constant communication with the atmosphere through a restricted port 122 and containing a spring 123 acting on the diaphragm for urging it in a downwardly direction. At the opposite side of the diaphragm and engaging same is a poppet valve 124 arranged to engage an annular seat rib 125 the diameter of which is considerably less than that of the diaphragm 120. The valve 124 is contained in a chamber 126 which is open through a choke 127 to passage 119. Within the seat rib 125 there is a chamber 128 which is connected to a passage 129 leading to the seat of slide valve 90.

The straight air suppression valve device further comprises a flexible diaphragm 130 having at one side a chamber 131 connected through a choke 132 with passage 117 and containing a spring 133 which acts on the diaphragm for urging same in a downwardly direction. At the opposite side of diaphragm 130 is a chamber 134 which is open to the atmosphere through a choke 135 and which contains a check valve 136 one face of which engages the diaphragm while the opposite face is arranged to engage an annular seat rib 137. Within the seat rib is a chamber 138 in direct communication with the passage 119 which is connected to the passage 129 through a choke 140.

*Operation of embodiment shown in Fig. 1*

Let it be assumed that the main reservoir 7 is charged with fluid under pressure in the usual manner and that the feed valve device 9 is supplying fluid at the usual reduced pressure from the main reservoir to pipe 14 leading to the brake valve device 1, to the application and release magnet valve device 3 and to valve chamber 47 in the application valve device 4. Let it also be assumed that the feed valve device 8 is supplying fluid at the desired reduced pressure from the main reservoir 7 to the valve chamber 80 in the timing valve device 5.

With the train control magnet 79 energized fluid under pressure will therefore be supplied from chamber 80 to the volume reservoir 67 and to chamber 66 beneath the valve piston 61 to hold said valve piston and thereby the double beat valve 52 in their upper positions shown and above described. With the double beat valve 52 thus seated in its upper position, the vent communication through pipe 49 from the application piston chamber 48 is closed and fluid under pressure flowing from the valve chamber 47 through a restricted port 141 in piston 45 into chamber 48 is permitted to equalize on the opposite sides of the piston 45. The spring 50 is then adapted to hold the piston 45 and slide valve 46 in their normal positions shown. With the engineer's brake valve handle 12 in its release position the poppet valve 15 is unseated by the cam 21 and the straight air control pipe 13 is vented as hereinbefore mentioned.

*Engineer's straight air application of brakes*

If the engineer desires to effect a straight air application of brakes on the locomotive and cars of the train he turns the brake valve handle 12 from release position into the application and release zone for thereby operating the self-lapping application and release valve portion 11 of the brake valve device to supply fluid under pressure to the straight air control pipe 13 at a pressure dependent upon the extent of movement of handle 12 into said zone.

The fluid pressure thus supplied to the pipe 13 flows through the double check valve device 6 to pipe 31 and then into diaphragm chamber 30 of the master switch device 2. This pressure acting on diaphragm 27 deflects same in the direction of the right hand and thereby operates the stem 29 to shift the movable contact 35 into engagement first with the contact finger 38 and then into engagement with the contact finger 39. As a consequence, the release train wire 40 is first energized and then the application train wire 41 becomes energized.

On the locomotive the release magnet valve portion 43 of the application and release magnet device 3 is energized by current supplied to the release train wire 40 and operates to close the vent communication from the straight air pipe 33, and immediately following, the application magnet valve portion 42 is energized by current supplied to the application train wire 41 and operates to supply fluid under pressure to the straight air pipe 33, and this fluid pressure is adapted to act through a branch pipe 142 on the brake controlling valve device (not shown) on the locomotive to apply the locomotive brakes.

Fluid under pressure supplied to the straight air pipe 33 flows therefrom into diaphragm chamber 32 of the magnet switch device 2 and acts on the diaphragm 28 in opposition to the control pressure in chamber 30 acting on the diaphragm 27. The application and release magnet valve device 4 operates to continue the supply of fluid under pressure to the straight air pipe 33 and thus to chamber 32 until the pressure in said chamber equals or slightly exceeds that in diaphragm chamber 30, at which time the diaphragm 28 is operated to move the contact 35 in the direction of the left hand out of engagement with the finger 39.

The application train wire 41 is consequently deenergized and likewise the application magnet valve portion 42 so as to cut off further supply of fluid under pressure to the straight air pipe 33 for thereby limiting the degree of straight air pipe pressure to substantially the same degree as provided in the straight air control pipe 13 so that the degree of application of brakes on the locomotive will correspond to the position of the brake valve handle 12 in the application and release zone.

As soon as the supply of fluid under pressure to the straight air pipe 33 is terminated as just described, movement of the diaphragm 28 in the master switch device 2 ceases and the movable contact 35 thus remains in contact with finger 38 thereby maintaining the release train wire 40 and the release magnet valve portion 43 of the application and release magnet valve device 3 in an energized condition so as to hold the fluid pressure in the straight air pipe 33 to thereby hold the brakes on the locomotive applied.

In case the engineer desires to increase the degree of brake application on the locomotive and cars of the train he operates the handle 12 further into the application and release zone to increase the pressure of fluid in the straight air control pipe 13. The master switch device 2 and the application and release magnet valve device 3 then operate as above described to provide a proportionate increase in pressure in the straight air pipe 33 and as a result a proportionate increase in the degree of brake application.

When the engineer desires to release the application of brakes on the locomotive and cars of the train he moves the brake valve handle 12 back toward its normal position shown and thus causes the self-lapping application and release valve portion 11 of the brake valve device to reduce the pressure of fluid in the straight air control pipe 13 and thereby in the diaphragm chamber 30 of the master switch device 2, accordingly. When the pressure in chamber 30 is thus reduced the higher straight air pipe pressure in chamber 32 deflects the diaphragm 28 back to its normal position out of contact with both of the fingers 38 and 39. Both the application and release magnet portions 42 and 43 of the application and release magnet valve device 3 are as a consequence deenergizd and permits fluid under pressure to be vented from the straight air pipe 33 for thereby effecting a release of the brakes on the locomotive.

*Automatic train control application of brakes*

With the brakes on the locomotive released and all parts of the apparatus in the normal positions as shown and with the locomotive and train running along a trackway, if the traffic conditions become unfavorable, as indicated by an adverse track signal, the train control magnet 70 will become deenergized and permit spring 82 to seat valve 72 and to unseat valve 71. Upon the unseating of valve 71 fluid under pressure is vented from chamber 66 at the lower face of piston 61 and from the connected volume reservoir 67 through choke 77, chamber 76 past the valve 71 to chamber 73 and then to atmosphere through the vent port 74 and the signal whistle 75. When the pressure of fluid is thus reduced in chamber 67 sufficiently, the spring 63 moves the valve piston 61 from the position shown downwardly into engagement with a gasket 143.

The combined volumes of chamber 66 and reservoir 67 are so related to the flow capacity of the choke 77 that the valve piston 61 will not be moved to its lower position as just described until after a certain period of time, such as six seconds, has elapsed from the deenergization of the magnet 70, for reasons which will be later brought out.

When the valve piston 61 is thus moved to its lower position, spring 59 shifts the double beat valve 52 from its upper seated position to its lower seated position for thereby connecting the application piston chamber 48 to pipe 54 leading to the straight air suppression valve device 10. The pipe 54 is normally opened to the atmosphere through a cavity 144 in slide valve 90 and thence through a passage 145, past a check valve 146 and through a passage 147 which is connected to pipe 17 which in turn is open to the atmosphere past the poppet valve 15 in the brake valve device with the brake valve handle 12 in its normal position. Under this condition therefore fluid under pressure will be vented from the application piston chamber 48 and when thus reduced to a sufficient degree below that in valve chamber 47, the differential of fluid pressures created on the application piston will move same and thereby the slide valve 46 against the spring 50 in an upwardly direction to an application position defined by engagement of the piston with a gasket 148.

In application position of the application slide valve 46 a passage 149, which in the normal position of said valve is open to the atmosphere through a port 150 in the valve and a vent passage 151, is uncovered by the lower end of the valve and opened to the valve chamber 47 whereupon fluid at feed valve pressure flows from said valve chamber to passage 149 and then to pipe 118 leading to the double check valve device 6. Fluid pressure thus supplied to the double check valve device flows through same and pipe 31 to chamber 30 in the master switch device 2 and therein acts to operate same to cause the application and release magnet valve device 3 to supply fluid to the straight air pipe 33 at a pressure equal to that supplied from feed valve device 9 to chamber 30, for thereby providing a full straight air application of the brakes on the locomotive and cars of the train.

In the application position of slide valve 46 a cavity 152 therein connects a passage 153 from the application piston chamber 48 directly to passage 147 which is open through pipe 17 and past the poppet valve 15 in the brake valve device 1 to the atmosphere, so that the application piston 45 and slide valve 46 will remain in application position and hold the brakes on the locomotive and train applied as long as the brake valve handle 12 is in release position, even though, subsequent to the automatic application of brakes being initiated, the magnet 70 should become energized in response to a favorable track signal, since it will be noted that the vent from the application piston chamber 28 by way of cavity 153 in the slide valve 46 by-passes the vent communication through the timing valve device 5.

*Release of automatic train control application of brakes*

In order to release an application of brakes effected in the manner just described, it is necessary that the engineer move the brake valve handle 12 from the release position into the application and release zone to permit seating of the poppet valve 15, the parts being so designed that said valve will become seated when the handle is so positioned in said zone as to provide substantially a full straight air application of brakes on the locomotive and when in this position it will be apparent that fluid under pressure will be supplied by the straight air application and release valve portion 11 of the brake valve device to the straight air control pipe 13.

When the poppet valve 15 is seated as just described, fluid under pressure flowing through the port 141 in the application piston 45 into piston chamber 48 and thereby into the communication connecting said chamber with the poppet valve chamber 16 in the brake valve device builds up the pressure therein and when increased sufficiently the spring 50 acts to move the piston 45 and slide valve 46 back to their normal positions shown. Upon the return of slide valve 46 to its normal position, pipe 118 leading to the double check valve device 6 is vented to the atmosphere through the vent port 151 and with fluid under pressure supplied to the straight air control pipe 13 by the brake valve device, the double check valve device 6 will then be operated to supply fluid from the pipe 13 to the master switch device 2 for thereby maintaining the brakes on the locomotive applied so long as the brake valve handle 12 is held in the application zone. It will be noted that upon return of the application slide valve 46 to its normal position the vent from piston chamber 48 by way of passage 153 to passage 147 is closed so that when desired the engineer may return the brake valve handle 12 to its release position for releasing the brakes on the locomotive and cars of the train and in which the poppet valve 15 is again unseated.

*Straight air suppression of brake application valve device 4*

The engineer may, if he is alert, suppress or prevent operation of the brake application valve device 4 to apply the brakes on the locomotive and cars of the train by operating the brake valve device 1 to apply the brakes before the double beat valve 52 in the timing valve device 5 moves to its lower position. As hereinbefore mentioned, there is a certain period of time, such as six seconds, between deenergization of the signal controlled magnet 70 and movement of the double beat valve 52 to its lower position. Also, promptly upon deenergization of the magnet 70 fluid under pressure is supplied to the whistle 75 for operating same to call the engineer's attention to the situation, so that he may before expiration of this time period, operate the brake valve device to initiate the application of brakes.

If the brake valve device is thus operated to supply fluid under pressure to the straight air pipe for initiating the application of brakes on the locomotive and cars of the train fluid pressure from the straight air pipe flows through the branch pipe 103 and passages 102 and 101 to diaphragm chamber 100 in the straight air suppression valve dveice 10 and therein acts on the diaphragm 85 to effect movement thereof and thereby of stem 89 and slide valve 90 in a downwardly direction against the opposing pressure of spring 113 and into engagement with the spring cage 109. In this temporary position communication is closed between pipe 54 from the timing valve device 5 and passage 145 so that upon subsequent movement of the double beat valve 52 in the timing valve device to its lower position fluid under pressure cannot be vented from the application piston chamber 48. Thus if an application of the brakes is promptly initiated by the engineer by operating the brake valve device 1, the application piston 45 and slide valve 46 will be prevented from moving from their normal position upon movement of the double beat valve 52 to its lower seated position.

At the same time as fluid under pressure is supplied to diaphragm chamber 100 in the straight air suppression valve device 10 and in the temporary suppression position thereof just described, fluid under pressure from the straight air pipe also flows through the passage 102 and a cavity 154 in the slide valve 90 to passage 129 and thence through choke 140 to passage 119 and from said passage past the upper end of the double check valve 107, which is normally seated in the position shown by spring 116, to passage 105 leading to the volume chamber or reservoir 106 and to the diaphragm chamber 104. Thus at the same time as fluid under pressure flows from the straight air pipe into diaphragm chamber 100 it also flows at a restricted rate through choke 140 to diaphragm chamber 104 and to the reservoir 106 for thereby charging said chamber and reservoir at a rate which is sufficiently slow to insure obtaining an adequate differential between the fluid pressure in diaphragm chambers 100 and 104 to move the diaphragms and slide valve 90 to and to then hold same in the temporary suppression position defined by the spring stop 109, as just described.

It will be noted that if the engineer attempts to limit the application of brakes on the locomotive by limiting the pressure of fluid supplied to the straight air pipe the pressure in diaphragm chamber 104 will tend to become equalized with that in diaphragm chamber 100 in which case the spring 113 would return the suppression slide valve 90 to its normal position. The application piston chamber 48 would then be vented and an automatic train control application of the brakes would occur, unless in the meantime, the track signal had become favorable and caused seating of the double beat valve 52 in the timing valve device 5 in its upper position. Thus if the track signal remains adverse the engineer is obliged to continue operation of the brake valve device 1 to initially supply fluid under pressure to the straight air pipe 33 and thereby to the diaphragm chamber 100 in the suppression valve device at a rate which will maintain said pressure sufficiently higher than that in diaphragm chamber 104 to hold the parts of the suppression valve device in the temporary suppression position against the pressure of spring 113.

The flow capacity of choke 140 and the combined volumes of reservoir 106 and diaphragm chamber 104 are so related however that after providing an initial pressure in the straight air pipe 33, such for instance as fifteen or twenty pounds to initiate the application of brakes on the locomotive and train the engineer may stop the supply of fluid under pressure to the straight air pipe for a certain limited period of time, such as two or three seconds, during which the pressure in the diaphragm chamber 104 will not become increased sufficiently through the choke 140 for the spring 113 to move the parts of the straight air suppression valve device back to their normal position. This slight lapse of time will permit the gathering of slack in the train due to the initial stage of brake application in case there is looseness in the couplers between the cars in the train, and such a lapse of time is also considered desirable to avoid excessive initial braking of the vehicle wheels with the attendant possibility of sliding of the wheels. More specifically, at the time an application of brakes is initiated the brake shoes and vehicle wheels will usually be relatively cool so that a relatively high coefficient of friction will be effective. Limiting the degree of the initial step of brake application will, however, provide for sufficient heating of the shoes and wheels to reduce the coefficient of friction before the expiration of the period of time above mentioned to such a degree that a subsequent increase in brake application to a degree required to provide a desired rate of retardation will not cause the wheels to slide.

Before the termination of the slight lapse of time following the initial step of increase in pressure in the straight air pipe 33, it is therefore necessary that the engineer continue operation of the brake valve device 1 to effect a further increase in the pressure of fluid in the straight air pipe 33 for increasing the degree of brake application on the locomotive and train and also for increasing the pressure on the diaphragm 85 in chamber 100 of the independent suppression valve device 10 for insuring against movement thereof back to its normal position.

As above mentioned, the supply of fluid under pressure to the diaphragm chamber 104 is so restricted by the choke 140 upon initiating the straight air application of the brakes with respect to the build up in pressure in the diaphragm chamber 100 as to insure operation of the independent suppression valve device to prevent operation of the brake application valve device 4 when the engineer initiates a straight air application of brakes as intended, and also said choke determines the rate at which the straight air pipe pressure must be increased to maintain the suppression valve device in the temporary suppression position.

After the pressure in the straight air pipe 33 has been increased to a degree slightly exceeding the initial step of brake application, this pressure acting through the passage 129 in chamber 128 on the check valve 120 overcomes the opposing pressure of spring 123 and moves said valve away from the seat rib 125. The pressure of fluid from chamber 128 then equalizes into the chamber 126 on the diaphragm 120 and since the area of the diaphragm is greater than that of the valve originally exposed to the pressure in chamber 128 before unseating thereof, said pressure acting on this greater area causes prompt deflection of the diaphragm against the spring 123 and thereby full seating movement of the check valve 120. Fluid under pressure supplied from the straight air pipe to passage 129 then flows through the check valve chamber 126 and choke 127 to passage 119 and then past the double check valve 107 to the volve reservoir 106 and also to the diaphragm chamber 104. It will be noted that the supply of fluid through the choke 127 is in parallel with that through choke 140 so that due to the combined capacities of the chokes the pressure in chamber 106 and in diaphragm chamber 104 will build up more rapidly than prior to the unseating of the check valve 120. It is therefore essential for the engineer to increase the rate at which fluid under pressure is supplied to the straight air pipe 33 and thereby to diaphragm chamber 100 in order to maintain a sufficient differential between the fluid pressures in chambers 100 and 104 to hold the parts of the independent suppression valve device in the temporary suppression position. This is desirable in order to enforce the engineer to apply the brakes on the locomotive and cars of the train with sufficient rapidity to insure that the train will be decelerated and possibly brought to a stop in substantially the same time as if the brakes were applied by operation of the brake application valve device 4.

It will now be noted that at the time the brake application is initiated the engineer may cause the brakes to be applied at a relatively slow rate for the purpose of gathering slack in the train and to avoid the possibility of slipping wheels but after the initial step of application is completed the engineer must then apply the brakes at a sufficiently faster rate to insure the safety of the train.

When by operation of the brake valve device the straight air pipe pressure has been increased to a predetermined relatively high degree such for instance as sixty pounds, which is adequate to insure the safety of the train, such pressure acting through passage 119 in chamber 138 on the check valve 136 is adapted to move said check valve away from the seat rib 137 against the opposing pressure of spring 133. When the check valve 136 is thus unseated fluid pressure flows from chamber 138 into chamber 134 and acts on the area of diaphragm 130, which is greater than that of the check valve previously subject to said fluid pressure, and as a result, the diaphragm 130 is promptly deflected in an upwardly direction to a sufficient extent to provide for full unseating of the check valve 136.

When the check valve 136 is thus unseated, fluid under pressure is then vented from the diaphragm chamber 104 and from the volume chamber or reservoir 106 past the upper end of the double check valve 107, through passage 119 to chamber 138 and thence through chamber 134 to the atmosphere through the restricted vent 135. When the pressure of fluid in the diaphragm chamber 104 is thus sufficiently reduced, fluid at straight air pipe pressure acting in diaphragm chamber 100 on the diaphragm 85 and through the stem 89 on the spring 113 and spring cage 109 overcomes the opposing pressure of spring 110 acting on said spring cage and moves said diaphragm and thereby the stem 89 and slide valve 90 from the temporary suppression position to a permanent suppression position which may be defined by engagement of the follower 87 with the casing. In this permanent suppression position communication is closed between passages 102 and 129 so as to prevent further flow of fluid under pressure to the volume reservoir 106 and to chamber 104, and the cavity 154 in slide valve 90 connects passage 129 to an atmospheric vent port 156 whereupon fluid pressure is completely vented from said chamber and reservoir. Straight air pipe pressure in diaphragm chamber 100 is then effective to maintain the parts of the suppression valve device in the permanent suppression position against the opposing pressures of springs 113 and 110 without any further increase in straight air pipe pressure.

It will thus be seen that if the engineer applies the brakes with a sufficient degree of force to insure unseating of the check valve 136 the suppression valve device will be conditioned to maintain the suppression slide valve 90 in the permanent suppression position without any further increase in the degree of brake application.

In this permanent suppression position the venting communication from the application piston chamber 48 by way of the double beat valve 52 in the timing valve device 5 is maintained closed the same as during temporary suppression so that the brake application valve device 4 cannot operate to effect an automatic train control application of the brakes so long as the brakes are held applied as just mentioned and the track signals remain unfavorable.

The vent passage 135 from the check valve chamber 134 is choked so as to offer such resistance to outflow of fluid under pressure from said chamber with respect to the rate at which fluid is supplied to said chamber past valve 136, that the pressure in said chamber will be increased to such a degree as to cause the diaphragm 136 to deflect sufficiently against spring 133 to permit full opening of the check valve 136. This prompt and full opening movement of the check vlave 136 is thus dependent upon the venting capacity of choked passage 135 and upon the prompt and relatively rapid inflow of fluid to chamber 134 upon unseating of check valve 136, and such rapid inflow is obtained from the diaphragm chamber 104 and volume reservoir 106 through the communication past the upper end of the double check valve 107 having a relatively great flow capacity.

It will be noted that the check valve 136 will remain open only as long as the fluid pressure in chamber 134 is able to overcome the pressure of spring 133 and after this pressure has become reduced sufficiently the spring 133 will return the check valve 136 into seating engagement with the seat rib 137. Before this occurs however the suppression slide valve 90 will have obtained its permanent suppression position connecting the diaphragm chamber 104 and the volume reservoir 106 to the atmosphere by way of the vent port 156, as above described, so that the diaphragm chamber 104 will be maintained at atmospheric pressure even after closing of check valve 136.

After the brakes on the locomotive have been applied, as just described, and the suppression valve device 10 has assumed its permanent suppression position the brakes on the locomotive and train cannot be released until after the track signals have become favorable to effect energization of the application magnet 70. If the engineer attempts to effect a release of brakes prior to this occurring, then just as soon as the straight air pipe pressure acting in chamber 100 of the straight air suppression valve device is reduced sufficiently the opposing pressure of spring 113 will return the suppression slide valve 90 to its normal position shown and thereby open the vent communication from the application piston chamber 48 to the atmosphere by way of the poppet valve 15, and as a result an automatic application of the brakes will occur.

However, after the application magnet 70 becomes energized due to a favorable track signal and the valve piston 61 operates to move the double beat valve 52 to its upper seated position for thereby closing the vent communication from the application piston chamber 48, then the engineer may operate the brake valve device 1 to effect a complete release of fluid under pressure from the straight air pipe 33 and thereby obtain a complete release of brakes on the locomotive and cars of the train. In effecting a release of brakes as just mentioned the parts of the straight air suppression valve device will be returned to their normal position by the pressure of spring 113 so as to be in condition for operation when again required.

*Prevention of suppression of the brake application valve device*

If the engineer fails to operate the brake valve device 1 to effect an application of brakes on the locomotive and cars of the train and thereby obtain operation of the independent suppression valve device 10 prior to the movement of the application piston 45 and slide valve 46 to their application positions in response to an adverse track signal, then the brakes on the locomotive and cars of the train will be applied by operation of the application valve device 4 in the manner before described. Under this condition operation of the brake valve device 1 by the engineer cannot effect operation of the straight air suppression valve device 10 to close the vent communication from the application piston chamber 48 since in the application position of the application slide valve 46 fluid pressure supplied to passage 149 for effecting operation of the master switch device also flows through passage 117 to the lower face of the double check valve 107 and effects movement thereof against spring 120 to its upper seated position. In this position passage 117 is connected to passage 105 so that at the same time fluid pressure is supplied to the master switch device fluid under pressure also flows to diaphragm chamber 104 and acting on the diaphragm 86 will maintain slide valve 90 in its normal position against straight air pipe pressure which will be obtained in the diaphragm chamber 100. Thus suppression of the brake application valve device 4 cannot be prevented unless the engineer operates the brake valve device prior to movement of the brake application valve device 4 to the application position.

When an automatic train control application of brakes is effected by operation of the application piston 45 and slide valve 46 it will be apparent that with the brake valve handle in release position there will be a leak of fluid under pressure past the poppet valve 15 to an extent limited by the capacity of choke 141 in the application piston 45 to supply fluid from the valve chamber 47 to the piston chamber 48. This leak however may be stopped by the engineer turning the brake valve handle 12 into the application and release zone to permit seating of the poppet valve 15. Under this condition fluid pressure vented from the application piston chamber 148 through the timing valve device and suppression slide valve 90 to passage 145 will flow into a stop reservoir 158 and eventually equalize therein with the pressure in the application valve chamber 47. When the pressure in the application piston chamber 48 is thus increased sufficiently, spring 50 will return the application piston 45 and slide valve 46 to their normal positions.

The volume of the stop reservoir 158 is however so related to the flow capacity of the restricted port 141 in the application piston 45 that a sufficient increase in the fluid pressure in the piston chamber 48 will not be obtained to permit spring 50 to return the application piston 45 and slide valve 46 to their normal positions until after a sufficient period of time has elapsed to insure an increase in pressure to diaphragm chamber 30 of the master switch device to a degree which will effect a full straight air application of the brakes on the locomotive and cars of the train.

When the piston 45 and slide valve 46 are returned to their normal positions it will be noted that pipe 118 through which fluid under pressure was supplied for applying the brakes will be vented, but a release of the brakes will not occur since with the brake valve handle 12 in the position providing for seating of the check valve 15, said brake valve device provides a sufficient pressure in the straight air control pipe 13 to insure safe braking of the train and this pressure acts upon venting of pipe 118 to shift the double checek valve device 6 to the position opposite that shown and then equalizes through pipe 31 into diaphragm chamber 30 of the master switch device 2 to maintain the brakes on the locomotive and on the cars of the train applied.

The port 92 connecting the valve chamber 91 in the independent suppression valve device 10 to the atmosphere is restricted as above mentioned in order to minimize loss of fluid under pressure from said chamber in case of breakage of either of the diaphragms 85 and 86. It will be noted that any such loss might be from the straight air pipe 33 by way of diaphragm chamber 100 and it is therefore important to reduce the degree of such possible loss to a point where it would not interfere with obtaining a straight air application of the brakes.

The restricted port 122 in the atmospheric vent from diaphragm chamber 120 is likewise provided to limit the loss of fluid pressure from the straight air pipe in case of breakage of the diaphragm 129, while the choke 132 between the diaphragm chamber 131 and passage 117 is adapted to minimize loss of fluid pressure supplied to said passage by the application valve 46 in its application position, past the diaphragm 130 in case of breakage thereof.

Figure 2:
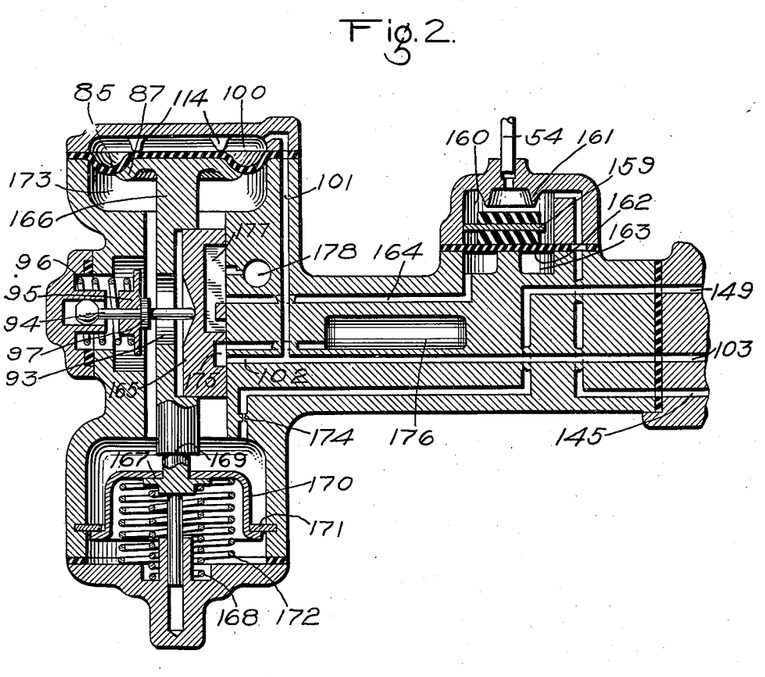
Fig. 2 is a diagrammatic sectional view of a modification of the invention.

*Embodiment of invention shown in Fig. 2*
*Description of parts*

In this embodiment of the invention communication between pipes 54 and passage 145, through which fluid under pressure is adapted to be vented from the application piston chamber 48 for effecting an automatic train control application of the brakes, is controlled by a check valve 159 which is disposed in a chamber 160 open to the passage 145 and which is adapted to be moved into seating engagement with a seat rib 161 for closing the communication. A flexible diaphragm 162 is provided for operating the check valve 159, said diaphragm having one face open to chamber 160 and having at the opposite face a chamber 163 connecting by a passage 164 to the seat of a suppression slide valve 165.

The slide valve 165 corresponds generally to the slide valve 90 shown in Fig. 1 and is arranged to be operated by a stem 166 which at one end is operatively connected to diaphragm 85 for movement therewith. Adjacent its other end, the stem 166 is provided with an annular collar 167 upon which acts a temporary suppression spring 168. The stem 166 is provided with a reduced portion between the collar 167 and a shoulder 169 which extends through an aperture provided in a spring cage 170 having an outwardly extending annular flange adapted to engage a stop ring 171 secured in the casing. A permanent suppression spring 172 acts on the cage 170 urging same into engagement with the stop ring 171 and is adapted to oppose movement of the cage in the opposite direction.

The diaphragm 85 has at its outer face the chamber 100 which is connected through passages 101 and 102 to the straight air pipe 33. The slide valve 165 is contained in a chamber 173 at the opposite side of the diaphragm 85 which chamber however is not vented as in the structure shown in Fig. 1, but instead, is connected to passage 149 leading to the seat of the application slide valve 46 through a restricted communication 174. With the slide valve 165 in its normal position shown passage 102 communicating with the straight air pipe 33 is open through a cavity 175 in slide valve 165 to volume chamber or reservoir 176. The slide valve is provided with a cavity 177 which in the normal position of the valve connects passage 164 from diaphragm chamber 163 to the atmosphere through a restricted vent port 178.

*Operation of embodiment shown in Fig. 2*

When an automatic application of the brakes is effected by operation of the application valve device 4 in response to deenergization of the magnet 70, the venting of fluid under pressure from the application piston chamber 48 is adapted to occur through the timing valve device 5 to pipe 54 as before described. In the structure shown in Fig. 2 the pipe 54 is normally open to the check valve chamber 160 so that with the check valve 159 unseated, as shown, fluid pressure vented from the application piston chamber 48 to the check valve chamber 160 will flow therefrom to passage 145 and then to the atmosphere past the poppet valve 15 with the brake valve handle 12 in its normal release position. The brake application piston 45 and slide valve 46 will then move to their application position and effect a straight air application of the brakes on the locomotive and cars of the train as before described.

In the application position of the slide valve 46 fluid under pressure supplied to passage 149 for effecting the application of brakes will also flow through the restricted communication 174 into valve chamber 173 of the independent suppression valve device and therein acting on the lower face of the suppression diaphragm 85 will maintain said diaphragm and thereby the slide valve 155 in their normal position shown in case an attempt is made by the engineer to suppress operation of the application piston and slide valve by operating the brake valve device to apply the brake, as will be presently described.

The choke is provided in the communication 174 so that in case of leakage or breakage of the diaphragm 85 when a straight air application of the brakes is effected by operation of the brake valve device 1, fluid pressure from the straight air pipe 33 and diaphragm chamber 100 which may thus leak into the chamber 173 will be restricted in its escape therefrom through passage 149 and vent port 151 under the application slide valve 46 so that such leak will not have any material effect upon the straight air pipe pressure.

In case the engineer desires to suppress operation of the application piston 45 and slide valve 46 upon deenergization of magnet 70 in response to an unfavorable track signal, he may operate the brake valve device 1 to effect a supply of fluid under pressure to the straight air pipe in two separate stages for thereby effecting a two-stage application of brakes in the manner before described.

When fluid under pressure is supplied to the straight air pipe by operation of the brake valve device as just mentioned, fluid flows from the straight air pipe through passages 102 and 101 into diaphragm chamber 100 of the independent suppression valve device and also from passage 102 through cavity 175 in slide valve 165 to the volume reservoir 176 for thereby charging said reservoir with fluid at substantially the same pressure as acting in the straight air pipe.

The preliminary suppression spring 168 acting on the diaphragm stem 166 is adapted to maintain said stem and thereby the slide valve 165 and diaphragm 85 in their normal positions shown until the straight air pipe pressure has been increased to a desired degree such as 15 or 20 pounds representing the first step of the application. When such a degree of pressure is obtained in the diaphragm chamber 100 the diaphragm is deflected downwardly against the opposing pressure of the preliminary suppression spring 168 until the shoulder 169 on the stem engages the spring cage which defines the temporary suppression position of the device. The pressure of the permanent suppression spring 172 on the spring cage 170 is such as to prevent further downward movement of the stem 166 by the straight air pipe pressure then acting in chamber 100.

In the preliminary suppression position of valve 165 the cavity 177 establishes communication between the volume reservoir 176, previously charged with fluid under pressure from the straight air pipe, and the passage 164 leading to chamber 163 below the diaphragm 162. The cavity 177 is also open to the atmosphere through the restricted vent port 178. Fluid under pressure is thus permitted to flow from the volume reservoir 176 to chamber 163 and therein acting on the diaphragm 162 is adapted to deflect same in a upwardly direction for moving the check valve 159 into engagement with the seat rib 161 for closing communication between pipe 54 from the timing valve device to passage 145. If the check valve 159 is thus seated prior to movement of the double beat valve 52 in the timing valve device 5 to its lower seated position fluid under pressure will not be vented from the application piston chamber 48 in the application valve device 4 and as a result the application valve device will not operate to effect an automatic application of the brakes.

It will be noted that while fluid under pressure from the volume reservoir 176 is acting in chamber 163 to hold the check valve 159 seated, it is also being vented to the atmosphere at a controlled rate through the restricted vent port 178 and the flow capacity of this vent port is so related to the volume of the reservoir 176 as to maintain sufficient pressure in chamber 163 for holding the check valve 159 seated against the opposing pressure of fluid in pipe 54 from the application piston chamber 128 for a period of time sufficient to permit gathering of the train slack et cetera, as hereinbefore mentioned in connection with the device shown in Fig. 1. In case the slide valve 165 remains in the preliminary suppression position for a longer period of time, then the pressure of fluid supplied through pipe 54 will unseat the check valve 159 and be vented to cause the application valve device 4 to operate to effect a straight air application of the brakes.

If, however, before the expiration of this time period the operator actuates the brake valve device 1 to increase the straight air pipe pressure to a degree such as sixty pounds which will insure the safety of the locomotive and cars of the train, this increased pressure acting in chamber 100 on the diaphragm 85 will overcome the opposing pressure of the permanent suppression spring 172 and move the stem 166 and thereby slide valve 165 to a permanent suppression position determined by engagement between the follower at the lower face of diaphragm 100 and the casing.

In this permanent suppression position of slide valve 165, the cavity 177 is adapted to connect the straight air pipe passage 182 to passage 164 so that fluid under pressure will be supplied directly from the straight air pipe 33 to diaphragm chamber 163 for maintaining the check valve 159 seated to thus prevent operation of the application piston 45 and slide valve 46 to their application positions so long as the brakes are maintained applied with a sufficient degree of force to hold the suppression valve device in the permanent suppression position.

When the track signal again becomes favorable and the magnet 70 is as a result again energized and the double beat valve 52 is moved to its upper seated position for closing the vent from the application piston chamber 48, the engineer may then operate the brake valve device 1 to effect a release of fluid under pressure from the straight air pipe 33 and thereby from diaphragm chamber 100 in the independent suppression valve device. The brakes on the locomotive and cars of the train will be thus released, and due to action of springs 168 and 172 in the independent suppression valve device the parts thereof will be returned to their normal position.

Summary

It will now be noted that, by the use of either form of independent suppression valve device, the engineer may by proper operation of the brake valve device 1 to effect an electropneumatic straight air application of brakes on the locomotive and cars of a train, prevent operation of the brake application valve device 4, and such application of brakes may be effected in two steps with an intervening lapse of time between the steps in order to avoid harsh gathering of the slack in the train in case such exists, and also to avoid the possibility of sliding of wheels as might occur in case the application were effected in one continuous stage. The independent suppression valve devices not only avoid the difficulties just mentioned but also permit a certain flexibility in effecting a brake application so as to avoid an excessive rate of development of deceleration which might be uncomfortable to passengers in a train. It should however be noted that in order to obtain permanent suppression of the brake application valve device 4 the engineer must apply the brakes to a sufficient degree to insure the safety of the train within a lapse of time which will slow down the train or bring it to a stop substantially as soon as if the application were due to automatic operation of the brake application valve device 4 upon deenergization of the magnet 70.

While only two embodiments of the invention have been shown and described in detail, it is not the intention to limit the scope to these embodiments or otherwise than by the terms of the appended claims.

Having now described my invention, what I claim as new and desire to secure by Letters Patent, is:

1. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, suppression means subject to the pressure in said straight air pipe and operative upon an increase in pressure therein to a predetermined degree within a chosen interval of time to render said train control means ineffective, said suppression means including means for rendering said train control means effective upon a less increase in straight air pipe pressure in said interval of time, and means set in operation upon initiating a straight air application of brakes for controlling said interval of time.

2. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, suppression means subject to the pressure in said straight air pipe and operative upon an increase in pressure therein to a predetermined degree within a chosen interval of time to render said train control means ineffective, said suppression means including means for rendering said train control means effective upon a less increase in straight air pipe pressure in said interval of time, and means set in operation upon initiating a straight air application of brakes for controlling said interval of time, operation of said train control means being adapted to render said suppression means non-operative by fluid supplied to said straight air pipe.

3. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, and suppression means controlled by the pressure of fluid in said straight air pipe for rendering said train control means either effective or ineffective, said suppression means including timing means set in operation upon supplying fluid under pressure to said straight air pipe for rendering said train control means ineffective for a chosen interval of time, said suppression means being operable by straight air pipe pressure when increased to a predetermined degree prior to termination of said interval of time to maintain said train control means ineffective, and means operable after termination of said interval of time with straight air pressure less than said predetermined degree to render said train control means effective.

4. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, and suppression means for rendering said train control means ineffective, said suppression means including means controlled by an increase in pressure in said straight air pipe and by the pressure in a chamber which is varied at a desired rate upon supplying fluid under pressure to said straight air pipe and being operative upon a predetermined variation in pressure in said chamber to render said train control means effective, and said means being responsive to an increase in pressure in said straight air pipe to a chosen degree prior to said predetermined variation in pressure in said chamber to render the pressure in said chamber non-controllable and to maintain said train control means ineffective.

5. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe in successive steps, and means conditionable upon the initial step of supply of fluid under pressure to said straight air pipe to render said train control means ineffective for a chosen interval of time, said means being conditionable by another step of increase in straight air pipe pressure prior to the termination of said interval of time to maintain said train control means ineffective.

6. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe in successive steps, suppression means for rendering said train control means ineffective for a period of time required to effect a predetermined variation in pressure in a chamber, said suppression means being operative upon the initial supply of fluid under pressure to said straight air pipe to initiate the variation in pressure in said chamber and upon a further increase in pressure in said straight air pipe prior to termination of said period of time to maintain said train control means ineffective, said train control means being rendered effective upon failure of said further increase in straight air pipe pressure prior to termination of said period of time.

7. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, and suppression means subject to straight air pipe pressure and the opposing pressure of fluid in a chamber adapted to be supplied with fluid under pressure from said straight air pipe at a restricted rate, said suppression means being operative upon a chosen rate of increase in pressure in said straight air pipe with respect to the rate of increase in pressure in said chamber to render said train control means ineffective and being operative upon an increase in straight air pipe pressure to a chosen degree to render said chamber pressure ineffective, said chamber pressure being adapted upon a slower rate of increase in pressure in said straight air pipe to condition said suppression means to render said train control means effective.

8. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, and suppression means operative upon initiating the supply of fluid under pressure to said straight air pipe to initiate a variation in pressure in a chamber, the pressure in said chamber being adapted to render said train control means ineffective for a chosen interval of time, said suppression means being operative upon an increase in pressure in said straight air pipe to a chosen degree before termination of said interval of time to maintain said train control means ineffective as long as the straight air pipe pressure is maintained equal to said chosen degree.

9. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, and suppression means controlled by the pressure of fluid in said straight air pipe and operative upon a chosen rate of increase in pressure therein to render said train control means ineffective and operative by a chosen degree of straight air pipe pressure to maintain said train control means ineffective while the straight air pipe pressure is not lower than said chosen degree, said suppression means including means conditioned during the supply of fluid under pressure to said straight air pipe to render said train control means effective if the rate of increase in straight air pipe pressure is less than said chosen rate.

10. In a fluid pressure brake, in combination, train control means operative automatically upon a change in track signals to effect an application of brakes, a straight air pipe to which fluid under pressure is adapted to be supplied for effecting an application of brakes, an engineer's brake valve device operative to effect a supply of fluid under pressure to said straight air pipe, and suppression means controlled by the pressure of fluid in said straight air pipe and being operative upon a chosen rate of increase in straight air pipe pressure during an initial step of increase in straight air pipe pressure and upon a faster rate of increase during a subsequent step of increase in straight air pipe pressure to render said train control means ineffective and operative by straight air pipe pressure when increased to a chosen degree to maintain said train control means ineffective, said suppression means including means conditioned during the supply of fluid under pressure to said straight air pipe to render said train control means effective if the rate of increase in straight air pipe is less than said chosen rates.

11. In a fluid pressure brake, in combination, train control means operative automatically upon a change in track signals to effect an application of brakes, a straight air pipe to which fluid pressure is adapted to be supplied to effect an application of brakes, an engineer's brake valve device for effecting a supply of fluid under pressure to said straight air pipe, and suppression means having a normal position for rendering said train control means effective upon a change in track signals and movable upon supply of fluid under pressure to said straight air pipe by operation of said brake valve device to a temporary suppression position for rendering said train control means temporarily ineffective, said suppression means being movable upon a further supply of fluid under pressure to said straight air pipe by operation of said brake valve device to a permanent suppression position for maintaining said train control means ineffective during the application of the brakes, and timing means operative in said temporary suppression position for rendering said train control means effective after a chosen lapse of time upon failure of said further supply of fluid under pressure to said straight air pipe.

12. In a fluid pressure brake, in combination, train control means operative automatically upon a change in track signals to effect an application of the brakes, a straight air pipe to which fluid under pressure is adapted to be supplied to effect an application of the brakes, an engineer's brake valve device for effecting a supply of fluid under pressure to said straight air pipe, and suppression means having a normal position for rendering said train control means effective upon a change in track signals and being movable therefrom upon a chosen initial increase in straight air pipe pressure to a temporary suppression position for rendering said train control means ineffective and operable by a higher pressure in said straight air pipe to maintain said train control means effective, and means conditioned during the initial increase in straight air pipe pressure to effect movement of said suppression means to said normal position after a chosen lapse of time upon failure to provide said higher pressure in said straight air pipe.

13. In a fluid pressure brake, in combination, train control means operative automatically upon a change in track signals to effect an application of brakes, a straight air pipe to which fluid under pressure is adapted to be supplied to effect an application of brakes, an engineer's brake valve device for effecting a supply of fluid under pressure to said straight air pipe, and suppression means having a normal position for rendering said train control means effective upon a change in track signals and movable upon a chosen initial increase in straight air pipe pressure to a temporary suppression position for rendering said train control means ineffective and responsive to a higher pressure in said straight air pipe to maintain said train control means ineffective, a chamber a predetermined variation in pressure in which is adapted to render said suppression means movable from said temporary suppression position to said normal position, said suppression means being operative upon said initial increase in straight air pipe pressure to initiate said variation in pressure in said chamber and upon said higher straight air pipe pressure prior to obtaining said predetermined variation to maintain said train control means ineffective, said suppression means being operative if said predetermined variation is obtained prior to said higher straight air pipe pressure to render said train control means effective.

14. In a fluid pressure brake, in combination, train control means operative automatically upon a change in track signals to effect an application of brakes, a straight air pipe to which fluid under pressure is adapted to be supplied to effect an application of brakes, an engineer's brake valve device for effecting a supply of fluid under pressure to said straight air pipe, and suppression means controlled by the differential between opposing fluid pressures in said straight air pipe and a volume for rendering said train control means either effective or ineffective, said suppression means normally venting said volume and being operative during an increase in straight air pipe pressure to supply fluid under pressure to said volume at a restricted rate and operative upon obtaining a predetermined pressure in said straight air pipe to cut off the supply of fluid under pressure to said volume and to vent the fluid under pressure therefrom, and means determining the rate of increase in straight air pipe pressure to provide the differential of fluid pressures required to render said train control means ineffective and operative to render said train control means effective on a less differential.

15. In a fluid pressure brake, in combination, train control means operative automatically upon a change in track signals to effect an application of brakes, a straight air pipe to which fluid under pressure is adapted to be supplied to effect an application of brakes, an engineer's brake valve device for effecting a supply of fluid under pressure to said straight air pipe, suppression means controlled by the opposing fluid pressures in said straight air pipe and in a normally vented chamber for rendering said train control means either effective or ineffective upon a change in track signals, said suppression means being operative upon an initial supply of fluid under pressure to said straight air pipe to render said train control means ineffective and upon a further supply of fluid under pressure to said straight air pipe within a predetermined interval of time after the termination of the initial supply to maintain said train control means ineffective, and means set in operation upon the initial supply of fluid under pressure to said straight air pipe to render said train control means effective at the termination of said interval of time and adapted to be rendered ineffective upon said further supply of fluid under pressure to said straight air pipe within said interval of time, said train control means when effective being operative to supply fluid under pressure to said normally vented chamber for rendering said suppression means non-responsive to pressure of fluid supplied to said straight air pipe.

16. In a fluid pressure brake, in combination, train control means operative automatically upon a change in track signals to effect an application of brakes, a straight air pipe to which fluid under pressure is adapted to be supplied to effect an application of brakes, an engineer's brake valve device operative to effect a supply of fluid under pressure to said straight air pipe, and suppression means for rendering said train control means either effective or ineffective upon a change in track signals, said suppression means comprising a movable abutment subject to straight air pipe pressure and the opposing pressure of fluid in a chamber and being movable by straight air pipe pressure to a suppression position for rendering said train control means ineffective, said train control means being adapted upon operation to supply fluid under pressure to said chamber to render said abutment non-responsive to straight air pipe pressure.

17. In a fluid pressure brake, in combination, train control means operative automatically upon a change in track signals to effect an application of brakes, a straight air pipe to which fluid under pressure is adapted to be supplied to effect an application of brakes, an engineer's brake valve device operative to effect a supply of fluid under pressure to said straight air pipe, and suppression means for rendering said train control means either effective or ineffective upon a change in track signals, said suppression means including a movable abutment subject to variations in fluid pressure in said straight air pipe and an opposing fluid pressure in a chamber normally open to said straight air pipe through a restricted communication, and means operable by said abutment upon a chosen rate of increase in straight air pipe pressure exceeding the rate of increase in pressure in said chamber to render said train control means ineffective and operative when the pressure in said straight air pipe is increased to a predetermined degree to vent fluid under pressure from said chamber for locking said arrangement in said position.

18. In a fluid pressure brake, in combination, train control means operative automatically upon a change in track signals to effect an application of brakes, a straight air pipe to which fluid under pressure is adapted to be supplied to effect an application of brakes, an engineer's brake valve device operative to effect a supply of fluid under pressure to said straight air pipe, and suppression means for rendering said train control means either effective or ineffective upon a change in track signals, said suppression means including a movable abutment subject to variations in fluid pressure in said straight air pipe and an opposing fluid pressure in a chamber normally open to said straight air pipe through a restricted communication, and means operable by said abutment upon a chosen rate of increase in straight air pipe pressure exceeding the rate of increase in pressure in said chamber to render said train control means ineffective and operative when the pressure in said straight air pipe is increased to a predetermined degree to vent fluid under pressure from said chamber for locking said arrangement in said position, said train control means being operative in effecting an application of brakes to supply fluid under pressure to said chamber for rendering said abutment non-responsive to straight air pipe pressure.

19. In a fluid pressure brake, in combination, train control means operative automatically upon a change in track signals to effect an application of brakes, a straight air pipe to which fluid under pressure is adapted to be supplied to effect an application of brakes, an engineer's brake valve device operative to effect a supply of fluid under pressure to said straight air pipe, and suppression means for rendering said train control means either effective or ineffective upon a change in track signals, said suppression means including a movable abutment subject to variations in fluid pressure in said straight air pipe and an opposing fluid pressure in a chamber normally open to said straight air pipe through a restricted communication, means operative upon a chosen increase in pressure in said straight air pipe to open another restricted communication between said chamber and straight air pipe, said abutment being operable upon an initial chosen rate of increase in straight air pipe pressure and upon a faster chosen rate of increase in pressure in said straight air pipe subsequent to operation of said means, to render said train control means ineffective, said rates exceeding the rates of increase in pressure in said chamber, said restricted communications having such flow capacity with respect to the volume of said chamber as to render said suppression means non-operable to maintain said train control means ineffective upon an increase in straight air pipe pressure at rates less than said chosen rates.

20. In a fluid pressure brake, in combination, train control means operative automatically upon a change in track signals to effect an application of brakes, a straight air pipe to which fluid under pressure is adapted to be supplied to effect an application of brakes, an engineer's brake valve device operative to effect a supply of fluid under pressure to said straight air pipe, and suppression means for rendering said train control means either effective or ineffective upon a change in track signals, said suppression means including a movable abutment subject to variations in fluid pressure in said straight air pipe and an opposing fluid pressure in a chamber normally open to said straight air pipe through a restricted communication, means operative upon a chosen increase in pressure in said straight air pipe to open another restricted communication between said chamber and straight air pipe, said abutment being operable upon an initial chosen rate of increase in straight air pipe pressure and upon a faster chosen rate of increase in pressure in said straight air pipe subsequent to operation of said means, to render said train control means ineffective, the flow capacity of the first named restricted communication being so related to the volume of said chamber that after said initial increase in straight air pipe pressure at the chosen rate a sufficient differential between the pressures in said straight air pipe and chamber will be provided on said abutment to hold said suppression means in condition to render said train control means ineffective for a chosen interval of time without further supply of fluid under pressure to said straight air pipe, a further increase in straight air pipe pressure being then effective to maintain said suppression means in said condition, and means operative upon an increase in pressure in said straight air pipe to a chosen higher degree to vent fluid under pressure from said chamber for locking said suppression means by straight air pipe pressure in the condition for maintaining said train control means ineffective.

21. In a fluid pressure brake, in combination, train control means operative automatically upon a change in track signals to effect an application of brakes, a straight air pipe to which fluid under pressure is adapted to be supplied for effecting an application of brakes, an engineer's brake valve device for supplying fluid under pressure to said straight air pipe, and suppression means for rendering said train control means ineffective upon operation of said brake valve device prior to operation of said train control means, said suppression means comprising a pair of springs, movable abutment means having a normal position for rendering said train control means effective and being movable therefrom upon a certain increase in said straight air pipe pressure against one of said springs to a temporary suppression position for rendering said train control means ineffective and against the other of said springs upon a further increase in straight air pipe pressure to a permanent suppression position for maintaining said train control means ineffective, and timing means conditioned upon said certain increase in straight air pipe pressure to maintain said suppression means in said temporary suppression position for a chosen interval of time.

22. In a fluid pressure brake, in combination, train control means operative automatically upon a change in track signals to effect an application of brakes, a straight air pipe to which fluid under pressure is adapted to be supplied for effecting an application of brakes, an engineer's brake valve device for supplying fluid under pressure to said straight air pipe, and suppression means for rendering said train control means ineffective upon operation of said brake valve device prior to operation of said train control means, said suppression means comprising a pair of springs, movable abutment means having a normal position for rendering said train control means effective and being movable therefrom upon a certain increase in said straight air pipe pressure against one of said springs to a temporary suppression position for rendering said train control means ineffective and against the other of said springs upon a further increase in straight air pipe pressure to a permanent suppression position for maintaining said train control means ineffective, timing means conditioned in said temporary suppression position to render the said one spring effective to move said abutment means back to said normal position after a chosen interval of time, and means operative upon movement of said abutment means to said permanent suppression position prior to termination of said interval of time to lock said abutment means therein.

23. In a fluid pressure brake, in combination, train control means operative automatically upon a change in track signals to effect an application of brakes, a straight air pipe to which fluid under pressure is adapted to be supplied for effecting an application of brakes, an engineer's brake valve device for supplying fluid under pressure to said straight air pipe, valve means for rendering said train control means ineffective upon operation of said brake valve device prior to operation of said train control means, said valve means having a normal position for rendering said train control means effective and being movable therefrom to a temporary suppression position and further to a permanent suppression position for rendering said train control means ineffective, a chamber, said valve means in said temporary suppression position opening a communication for charging said chamber with fluid under pressure at a restricted rate and in said permanent suppression position venting fluid under pressure from said chamber, movable abutment means for moving said valve means to its different position and subject to the pressure of fluid in said straight air pipe and the opposing pressure of fluid in said chamber, a spring for opposing movement of said abutment means from said normal position to temporary suppression position, another spring for opposing movement of said abutment means from said temporary suppression position to said permanent suppression position, an increase in straight air pipe pressure at a rate sufficiently exceeding the rate of increase in pressure in said chamber being adapted to operate said abutment means to move said valve means to said permanent suppression position, the first named spring being operative to actuate said abutment means to move said valve means to said normal position upon a slower rate of increase in straight air pipe pressure.

24. In a fluid pressure brake, in combination, train control means operative automatically upon a change in track signals to effect an application of brakes, a straight air pipe to which fluid under pressure is adapted to be supplied for effecting an application of brakes, an engineer's brake valve device for supplying fluid under pressure to said straight air pipe, valve means for rendering said train control means ineffective upon operation of said brake valve device prior to operation of said train control means, said valve means having a normal position for rendering said train control means effective and being movable therefrom to a temporary suppression position and further to a permanent suppression position for rendering said train control means ineffective, a chamber, a movable abutment for moving said valve means to its different positions and subject to pressure of fluid in said straight air pipe and the opposing pressure of fluid in said chamber, a spring for opposing operation of said abutment to move said valve means from said normal position to said temporary suppression position, a second spring for opposing operation of the abutment to move said valve means from said temporary suppression position to said permanent suppression position, said valve means being operative during an initial stage of increase in pressure in said straight air pipe to supply fluid under pressure to said chamber at a restricted rate, and means operative during a subsequent stage of increase in straight air pipe pressure to increase the rate at which fluid under pressure is supplied to said chamber, said abutment being movable against said springs upon an increase in straight air pipe pressure at a rate sufficiently exceeding the rates of increase in pressure in said chamber to move said valve means to said temporary suppression position and then to said permanent suppression position, said valve means in said permanent suppression position venting said chamber for locking said abutment and valve means in said permanent suppression position by straight air pipe pressure.

25. In a fluid pressure brake, in combination, train control means operative automatically upon a change in track signals to effect an application of brakes, a straight air pipe to which fluid under pressure is adapted to be supplied for effecting an application of brakes, an engineer's brake valve device for supplying fluid under pressure to said straight air pipe, valve means for rendering said train control means ineffective upon operation of said brake valve device prior to operation of said train control means, said valve means having a normal position for rendering said train control means effective and being movable therefrom to a temporary suppression position and further to a permanent suppression position for rendering said train control means ineffective, a chamber, a movable abutment for moving said valve means to its different positions and subject to pressure of fluid in said straight air pipe and the opposing pressure of fluid in said chamber, a spring for opposing operation of said abutment to move said valve means from said normal position to said temporary suppression position, a second spring for opposing operation of the abutment to move said valve means from said temporary suppression position to said permanent suppression position, said valve means being operative during an initial stage of increase in pressure in straight air pipe to supply fluid under pressure to said chamber at a restricted rate, means operative during a subsequent stage of increase in straight air pipe pressure to increase the rate at which fluid under pressure is supplied to said chamber, said abutment being movable against the first named spring to said temporary suppression position and being maintained therein upon an increase in straight air pipe pressure at a rate sufficiently exceeding the rates of increase in pressure in said chamber, and a valve device operative upon an increase in straight air pipe pressure to a desired relatively high degree for venting fluid under pressure from said chamber to thereby render said abutment operative to move said valve means to said permanent suppression position, said valve means in said permanent suppression position also venting said chamber.

26. In a fluid pressure brake, in combination, train control means operative automatically upon a change in track signals to effect an application of brakes, a straight air pipe to which fluid under pressure is adapted to be supplied for effecting an application of brakes, an engineer's brake valve device for supplying fluid under pressure to said straight air pipe, and suppression means adapted to be operated by fluid under pressure supplied to said straight air pipe by operation of said brake valve device prior to operation of train control means to prevent operation of said train control means upon a change in track signals, said suppression means comprising a movable abutment having at one side a chamber open to said straight air pipe, a valve having a normal position for rendering said train control means ineffective upon a change in track signals, said valve being movable by said abutment upon an increase in straight air pipe pressure in said chamber from said normal position to a temporary suppression position for rendering said train control means ineffective, a volume in which a predetermined variation in pressure in a certain interval of time is operative to render said train control means effective, said valve in said temporary suppression position being operative to effect said variation in pressure in said chamber, a further increase in pressure in said straight air pipe on said abutment prior to termination of said interval of time being operative to move said valve to a permanent suppression position for maintaining said train control means ineffective, and said train control means being operative upon response to a change in track signals to supply fluid to counteract straight air pipe pressure in said chamber acting on said movable abutment to render said abutment non-operable by fluid pressure supplied to said chamber.

27. In a fluid pressure brake, in combination, a pipe to which fluid under pressure is adapted to be supplied to effect an application of the brakes, an engineer's brake valve device operative to effect a supply of fluid under pressure to said pipe, train control means operative automatically upon a change in track signals to effect an application of brakes, and suppression means operative upon said operation of said brake valve device prior to response of said train control means to a change in track signals to render said train control means ineffective, said suppression means comprising a movable abutment subject to variations in pressure in said pipe and being movable upon a certain increase in pressure in said pipe to a temporary suppression position, timing means conditioned to operate in said temporary suppression position to render said train control means ineffective for a certain interval of time, means operative at the expiration of said interval of time to render said train control means effective, said abutment being movable by a further increase in pressure in said pipe prior to the expiration of said interval of time to a permanent suppression position for maintaining said train control means ineffective.

28. In a fluid pressure brake, in combination, train control means operative automatically upon a change in track signals to effect an application of brakes, a pipe to which fluid under pressure is adapted to be supplied to effect an application of brakes, an engineer's brake valve device operative to effect a supply of fluid under pressure to said pipe, and suppression means operative upon said operation of said brake valve device prior to response of said train control means to a change in track signals to render said train control means ineffective, said suppression means comprising movable abutment means, a valve movable by said abutment means and having a normal position for rendering said train control means effective and being movable therefrom to a temporary suppression position and further to a permanent suppression position for rendering said train control means ineffective, a spring for opposing movement of said valve to said temporary suppression position, another spring for opposing movement of said valve to said permanent suppression position, said abutment means being subject to pressure in said pipe and to the opposing pressure of fluid in a chamber, said valve in said normal and temporary suppression positions establishing a restricted communication between said pipe and said chamber whereby an increase in pressure in said pipe at a rate sufficiently exceeding the increase in pressure in said chamber will actuate said abutment means to move said valve to said temporary suppression position against the first named spring and whereby upon an increase in pressure in said pipe to a predetermined degree, said abutment means and valve will remain in said temporary suppression position for a chosen interval of time without further increase in pressure in said pipe, valve means operative upon a further increase in pressure in said pipe to increase the rate at which fluid is supplied from said pipe to said chamber for requiring a faster rate of increase in pressure in said pipe to maintain said valve in said temporary suppression position, and other valve means operative upon an increase in pressure in said pipe to a still higher degree for venting fluid under pressure from said chamber to render the pressure in said pipe operative to actuate said abutment means to move said valve to said permanent suppression position, said train control means being operative in effecting an application of brakes to supply fluid under pressure to said chamber to render said suppression means non-operable.

29. In a fluid pressure brake, in combination, train control means operative automatically upon a change in track signals to effect an application of brakes, a pipe to which fluid under pressure is adapted to be supplied to effect an application of brakes, an engineer's brake valve device operative to effect a supply of fluid under pressure to said pipe, and suppression means operative upon said operation of said brake valve device prior to response of said train control means to a change in track signals to render said train control means ineffective, said suppression means comprising a valve operative by fluid under pressure to render said train control means ineffective and operative when the pressure of such fluid is reduced to a low degree to render said train control means effective, a pair of springs, a chamber, valve means, and movable abutment means subject to pressure of fluid in said pipe and operative upon a chosen initial increase in pressure in said pipe to move said valve means from a normal position to a temporary suppression position against the pressure of one of said springs and upon a further increase in pressure in said pipe to a permanent suppression position against the other spring, said valve means in said normal position connecting said chamber to said pipe to provide for charging of said chamber with fluid under pressure from said pipe and in said temporary suppression position connecting said chamber to said valve and to a restricted atmospheric vent whereby the pressure in said chamber is adapted to gradually reduce and when reduced to a chosen low degree to hold said valve in the position to render said train control means ineffective, said valve means in said permanent suppression position being operative to supply fluid under pressure from said pipe to said valve to maintain said train control means ineffective, said train control means being operative in effecting an application of brakes to supply fluid under pressure to act on said abutment means for rendering same non-operable by fluid under pressure from said pipe.

ERIK G. ERSON.